July 14, 1931.          J. W. TATTER          1,814,574
BRAKE MECHANISM
Filed Nov. 3, 1926          2 Sheets-Sheet 1
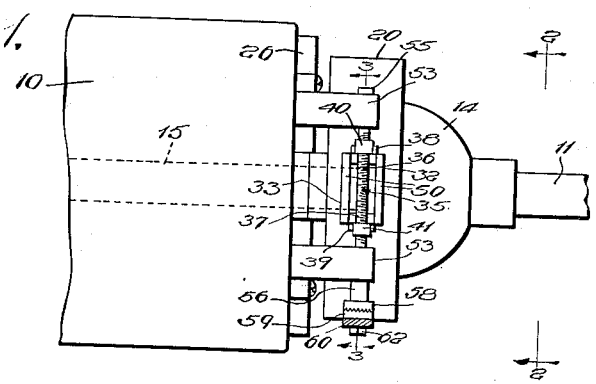
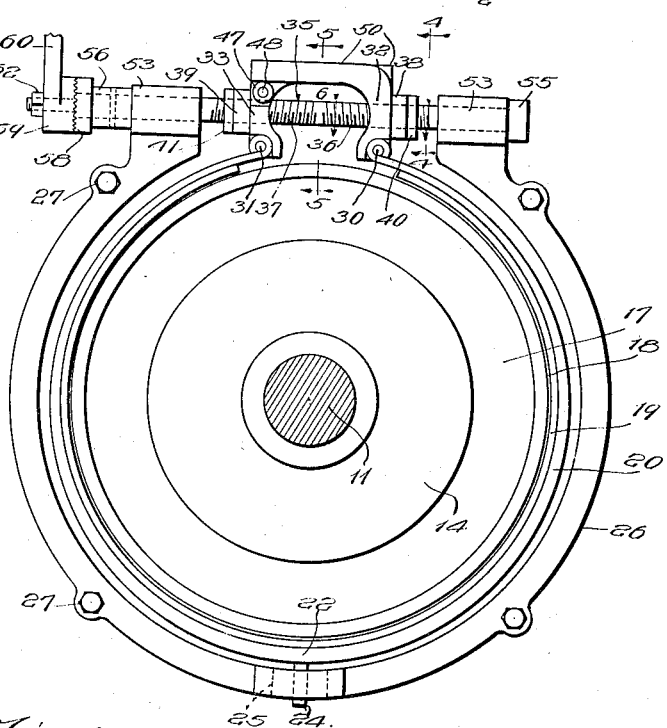
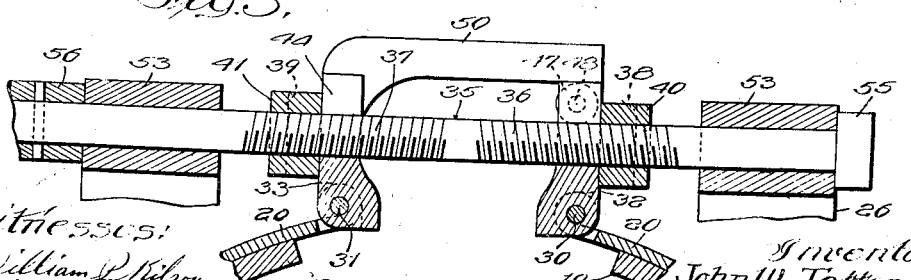
Witnesses:
William P. Riley
Harry L. White
Inventor:
John W. Tatter
By Hill & Hill

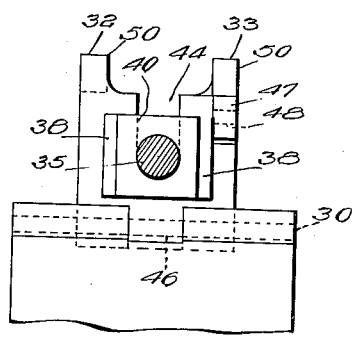
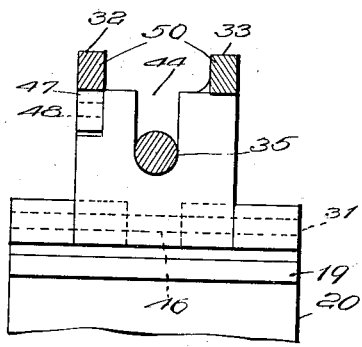
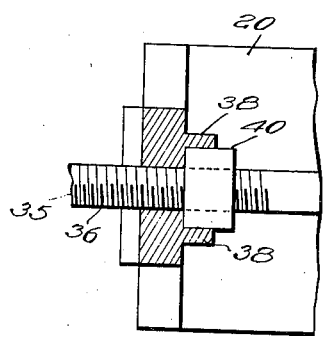
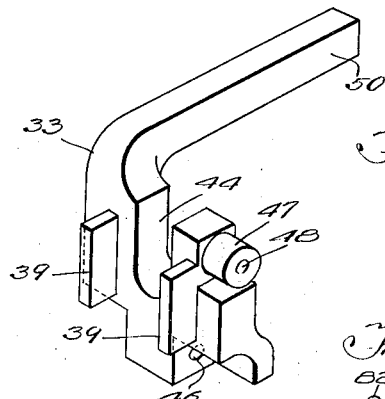
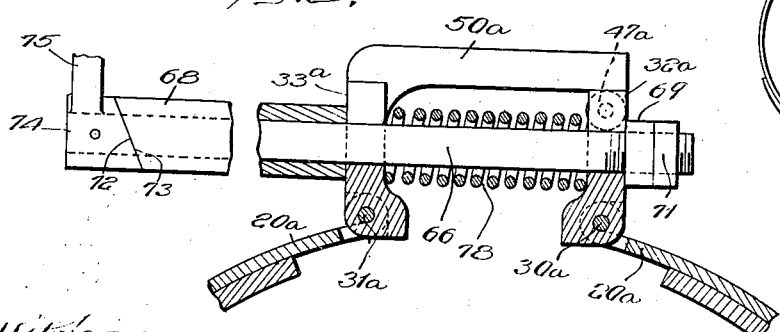
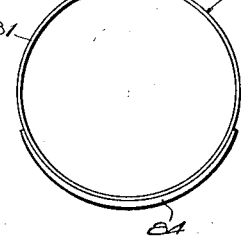

Patented July 14, 1931

1,814,574

UNITED STATES PATENT OFFICE

JOHN W. TATTER, OF CHICAGO, ILLINOIS, ASSIGNOR TO LEWIS DIFFERENTIAL COMPANY, OF CHICAGO, ILLINOIS, A CORPORATION OF ILLINOIS

BRAKE MECHANISM

Application filed November 3, 1926. Serial No. 145,970.

My invention relates to brake mechanism and has among its other objects, the production of mechanism of the kind described which is compact, convenient, durable, efficient and satisfactory for use wherever found applicable.

The invention is particularly adapted to be embodied in mechanism of the kind comprising brake drums and brake bands, or the equivalent, a particular object of the invention being to provide improved means for frictionally engaging the brake drum so that the braking effort is applied smoothly and effectively without chattering and without subjecting any particular portion of the brake band to more wear than another portion thereof.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a plan elevation of braking mechanism embodying my invention, the braking mechanism being shown in connection with the transmission housing and the propeller shaft of an automobile;

Fig. 2 is an enlarged section taken on line 2—2 of Fig. 1;

Fig. 3 is an enlarged section taken on line 3—3 of Fig. 1;

Fig. 4 is a section taken on line 4—4 of Fig. 2;

Fig. 5 is a section taken on line 5—5 of Fig. 2;

Fig. 6 is a section taken on line 6—6 of Fig. 2;

Fig. 7 is a perspective view of one of the parts of my improved braking mechanism;

Fig. 8 is a fragmentary section taken through braking mechanism embodying another form of my invention; and Fig. 9 is an elevation at a reduced scale of a brake band embodying still another form of the invention.

Referring for the present to Figs. 1 to 7 inclusive wherein I have shown a preferred form of the invention embodied in braking mechanism particularly adapted to be employed in connection with automobiles and the like, the reference character 10 designates the transmission housing of an automobile. At 11, I have shown the propeller shaft of an automobile, the propeller shaft 11 being operatively connected to the transmission (not shown) by the usual universal joint 14 and the shaft section 15 projecting from the transmission housing 10. Constrained to rotate with the shaft section 15 is a brake drum 17 formed with a cylindrical surface 18 which is engageable by a friction lining 19, the friction lining 19 being carried by an arcuate brake band 20. In this instance, the friction lining 19 is secured in any suitable manner to the inner surface of the brake band 20 and the outer surface of the brake band is eccentrically formed with respect to the inner surface. Thus, the thickest portion of the brake band 20 is at a point substantially midway between the ends thereof and is designated by the reference character 22. Secured to the portion 22 of the brake band 20 and projecting therefrom is a pin 24 which rides in a slot 25 formed in a bracket member 26 which is rigidly secured to the transmission housing 10 by any suitable means, such as, for instance, bolts 27 or the equivalent. The slot 25 is arranged circumferentially with respect to the brake drum 17 so that the brake band 20 may be displaced circumferentially of the brake drum but cannot move laterally with respect thereto. The ends of the brake band 20 are hinged or pivoted by pins 30 and 31 to members 32 and 33 respectively, movable along a rod 35 which is preferably provided with right and left hand screw threads 36 and 37, respectively. The members 32 and 33 are provided with lugs 38 and 39, respectively, which engage nuts 40 and 41, respectively, and prevent angular displacement of the nuts relative to the members. It will be noted that the nuts 40 and 41 engage the screw threads 36 and 37 respectively. Obviously, if the rod 35 is rotated in one direction, the nuts 40 and 41 will move toward each other and cause the members 32 and 33 to bring the ends of the brake band 20 toward each other so that the friction lining 19 will engage the brake drum 17. If the rod 35 is rotated in the opposite direction, the nuts 40 and 41 will move away from each other so that the brake band 20 may expand and bring the friction lining 19 out of effective engagement with the brake drum. It is understood, of course, that the brake band 20 is preferably resilient so that it normally assumes a form wherein it will not cause the brake lining 19 to effectively engage the brake drum.

The members 32 and 33 are substantially identical in form. Referring to Fig. 7, wherein I have shown a perspective view of the member 33, it will be noted that the member is provided with a slot 44 which accommodates the rod 35 and that the member is provided with an aperture 46 adapted to receive the pin 31. As shown, the member 33 is provided with an anti-friction roller 47 mounted upon a pin 48 which projects from the member. Projecting from the member 33 is a relatively long finger or lug 50 adapted to ride upon the anti-friction roller 47 of the member 32, it being understood that the member 32 is also provided with a finger or lug 50, a slot 44 and an aperture 46. The construction is such that when the members 32 and 33 are displaced along the rod 35, the fingers or lugs 50 ride upon the anti-friction rollers 47 and prevent the members 32 and 33 from tipping or pivoting around the longitudinal axes of the pins 30 and 31 so that the ends of the friction lining 19 can be brought into effective engagement with the brake drum 17 before the substantially central portion of the friction lining is brought into effective engagement therewith.

The rod 35 is preferably rotatably journaled in bearings 52 and 53 formed integral with the bracket member 26, the rod 35 being held against longitudinal displacement in the bearings by a head 55 formed integral with the rod and a collar 56 pinned to the rod. Preferably formed integral with the collar 56 is a rosette member 58 engageable by a rosette member 59 formed integral with a lever 60. The lever 60 is mounted upon one end of the rod 35 and a nut 62 is preferably screw-threaded upon the rod to hold the lever 60 in a position wherein its rosette member 59 will effectively engage the rosette member 58. Obviously, the nut 62 may be manipulated to permit angular displacement of the rosette member 59 relative to the rosette member 58 so that the lever 60 may be brought into a plurality of adjusted positions with respect to the rod 35 and the brake band 20. Only a portion of the lever 60 is shown in the drawings, but it is readily understood that the lever 60 may be provided with a foot pedal (not shown), or it may be made in a form of a relatively long lever of the type commonly employed in connection with the emergency brakes for automobiles. If so desired, means such as links (not shown) or the equivalent, may be interposed between the lever 60 and a foot pedal (not shown) or another lever (not shown) which may be manipulated by the driver of the automobile.

The operation of the braking mechanism shown in Figs. 1 to 7 inclusive is substantially as follows: Assuming that the several parts of the mechanism are substantially in the positions wherein they are shown in Fig. 2 and that the driver of the automobile wishes to apply a braking action to the propeller shaft 15, it is obvious that if the driver manipulates a foot pedal, or the equivalent, to angularly displace the rod 35 so that the nuts 40 and 41 will move toward each other, the ends of the brake band 20 will be moved toward each other and the lining 19 will engage the brake drum 17 and retard rotation thereof. Because of the fact that the brake band 20 diminishes in thickness from its central portions to its ends, the brake band will be contracted in such manner that substantially all of the inner surface of the friction lining 19 will immediately engage the brake drum. This distinguishes from braking apparatus wherein brake bands are provided having substantially the same thickness throughout their lengths, for in such construction, the brake bands tend to bend at first at points disposed substantially midway between their ends, these points being subjected to the greatest leverage. When brake bands first bend at the points located substantially midway between their ends, the portions of friction lining disposed adjacent the ends of the brake bands engage the brake drum before the central portions of the friction lining comes into engagement therewith. Obviously, the end portions of the friction linings will then be subjected to more wear than the central portions thereof. Then, because the brake drum is not engaged by substantially the entire friction lining in each instance, the braking action is not efficient. In apparatus embodying my invention, the friction lining engages the brake drum in such manner that the braking action is smooth.

The construction of the members 32 and 33 is particularly advantageous in that these members can not pivot or rock around the longitudinal axes of the pins 30 and 31 toward each other as the lugs 50 riding upon the anti-friction rollers 47 prevent such movement thereof. It will be readily understood that if the upper portions of the members 32 and 33 could move toward each other without like movement of the lower portions thereof, the ends of the brake band 20 would be moved inwardly toward the brake drum 17 before the portion 22 thereof would bring the central portion of the lining into engagement with the drum.

In Fig. 8, I have illustrated another form of the invention embodied in braking mechanism particularly adapted to be employed in Ford automobiles, and the like, only a portion of such mechanism being shown as it is unnecessary to again illustrate the brake drum and brake band thereof. The brake drum and brake band are preferably of the same construction as that shown in Figs. 1 to 7 inclusive. However, the means for bringing the brake band into a position wherein it will cause the friction lining to engage the brake drum is somewhat different in construction from the similar means shown in Figs. 1 to 7 inclusive. In Fig. 8, I have shown members 32a and 33a which resemble the aforementioned members 32 and 33 and are secured to a brake band 20a by pins 30a and 31a respectively. The members 32a and 33a are provided with lugs 50a engageable with anti-friction rollers 47a carried by the members, it being understood that the lug 50a of each member 32a and 33a engages the anti-friction roller 47a carried by the other members. Projecting through the members 32a and 33a is a rod 66 which is slidably journaled in a bracket member 68 fixed upon any convenient portion of the chassis of the automobile. A nut 69 screw threaded upon one end of the rod 66 engages the outer face of the member 32a and may be locked in a plurality of adjusted positions upon the rod by a lock nut 71. A cam face 72 formed upon the bracket member 68 is engageable by a cam face 73 formed upon a hub 74 forming part of a foot pedal or lever 75, the hub 74 being pinned to the rod 66. Obviously, when the foot pedal or lever 75 is angularly displaced around the longitudinal axis of the rod 66 to rotate the rod, the cam faces 72 and 73 will cause the rod 66 to be longitudinally displaced to the left (Fig. 8) so that the member 32a will move toward the member 33a. Such displacement of the member 32a will be accompanied by contraction of the brake band 20a so that it will bring its friction lining into engagement with the brake drum. The braking action of the mechanism shown in Fig. 8 is substantially identical with that of the mechanism shown in Figs. 1 to 7 inclusive, however, in the mechanism shown in Fig. 8, I preferably provide a compression spring 78 between the members 32a and 33a, the compression spring 78 being disposed around the rod 66. The spring 66 functions to release the brake band when the foot pedal or lever 75 is permitted to return to its normal position and also functions to hold the member 32a against the nut 69 so that it cooperates with the lock nut to prevent undesirable angular displacement of the nut 69.

Referring now to Fig. 9 wherein I have shown another form of the invention embodied in the brake band designated generally by the reference character 80, it will be noted that the brake band 80 comprises a metallic strip 81 which is substantially of the same thickness throughout its entire length and is provided with eyes 82 and 83 adapted to receive the pins such as pins 30 and 31. Secured to the outer surface of the strip 81 is a second strip 84 which reenforces the central portion of the strip 81 and prevents it from bending in an undesirable manner when the eyes 82 and 83 are moved toward each other. Obviously the brake band 80 may be employed in place of the aforementioned brake band 20 in some instances if it is so desired.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. The combination with a brake drum, of a brake band having a friction lining engageable with the drum interengaging members secured to the ends of the brake band and constrained to move in a straight line toward or away from each other without tipping toward each other, and means for causing relative movement between said members to bring said friction lining into effective engagement with the brake drum.

2. The combination with a brake drum, of a brake band having a friction lining engageable with the drum, members slidably engageable with each other secured to the ends of the brake band, and means for causing relative movement between said members to bring said friction lining into effective engagement with the brake drum.

3. The combination with a brake drum, of a brake band having a friction lining engageable with the drum, members secured to the ends of the brake band and provided with lugs extending therefrom, anti-friction rollers carried by said members and engageable by said lugs, and means for causing relative movement between said members to bring said friction lining into effective engagement with the brake drum.

4. The combination with a brake drum, of a brake band having a friction device engageable with the drum, members secured to the ends of the brake band and having interengaging parts for preventing said members from tipping toward each other when they are displaced relative to each other, and means for causing relative movement between said members to bring said friction device into effective engagement with the brake drum.

5. The combination with a brake drum, of a brake band having a friction device engageable with the drum, interengaging members pivoted to the ends of the brake band and constrained to move in a straight line toward each other without angular displacement around their pivoted axes, and means for causing relative movement between said members to bring said friction device into effective engagement with the brake drum.

6. A brake comprising a brake drum, a brake band associated with said drum, means for causing relative movement between the ends of the brake band to displace the band relative to the drum, and a plurality of guide members secured to said band and adapted to limit movement of the ends of said band to a predetermined direction.

7. A brake comprising a brake drum, a brake band associated with said drum, means for causing relative movement between the ends of the brake band to displace the band relative to the drum, and a plurality of guide members pivoted to said band and adapted to limit movement of the ends of said band to a predetermined direction.

8. A brake comprising a brake drum, a brake band associated with said drum, means for causing relative movement between the ends of the brake band to displace the band relative to the drum, and a plurality of guide members secured to said band and adapted to limit movement of the ends of said band to a straight line.

In testimony whereof, I have hereunto signed my name.

JOHN W. TATTER.